United States Patent [19]

Mitani et al.

[11] Patent Number: 5,300,197
[45] Date of Patent: Apr. 5, 1994

[54] DISTILLATION APPARATUS WITH POROUS MEMBRANE AND HEAT PUMP

[75] Inventors: Kenji Mitani; Akira Ashida, both of Yokohama; Katsuya Ebara, Mito; Hideaki Kurokawa, Hitachi, all of Japan

[73] Assignee: Hitachi, Ltd., Tokyo, Japan

[21] Appl. No.: 625,106

[22] Filed: Dec. 10, 1990

[30] Foreign Application Priority Data

Dec. 12, 1989 [JP] Japan ................ 1-320466

[51] Int. Cl.$^5$ .................. B01D 3/00; B01D 61/36
[52] U.S. Cl. .................. 202/177; 202/182; 202/185.2; 202/200; 202/202; 159/DIG. 27; 159/DIG. 28; 203/10; 203/22; 203/24; 203/26; 203/39; 203/100; 203/DIG. 8; 203/DIG. 16; 210/640
[58] Field of Search .......... 203/DIG. 4, 24, 26, 203/39, 40, DIG. 8, DIG. 16, 100, 10, 22; 159/DIG. 27, DIG. 28; 202/177, 182, 185.2, 202, 200, 176; 210/640

[56] References Cited

U.S. PATENT DOCUMENTS

| | | |
|---|---|---|
| 3,340,186 | 9/1967 | Weyl . |
| 3,878,054 | 4/1975 | Rodgers .................. 203/88 |
| 4,316,774 | 2/1982 | Trusch .................. 159/DIG. 27 |
| 4,537,660 | 8/1985 | McCord .................. 203/DIG. 4 |
| 4,584,061 | 4/1986 | Shelton .................. 203/DIG. 4 |
| 4,645,569 | 2/1987 | Akabane et al. .......... 203/DIG. 8 |
| 4,728,397 | 3/1988 | Kjellander et al. ....... 159/DIG. 27 |
| 4,746,437 | 5/1988 | Kosecki et al. .......... 203/DIG. 17 |
| 4,770,748 | 9/1988 | Cellini et al. ............ 203/DIG. 4 |

FOREIGN PATENT DOCUMENTS

49-45461 12/1974 Japan .
2035813 6/1980 United Kingdom ......... 203/DIG. 4

OTHER PUBLICATIONS

Proceedings of the Sixteenth International Symposium on Space Technology and Science, 1988, pp. 1709–1711.
Proceedings of the Fifteenth International Symposium on Space Technology and Science, 1986, pp. 1355–1359.

Primary Examiner—Wilbur Bascomb, Jr.
Attorney, Agent, or Firm—Fay, Sharpe, Beall, Fagan, Minnich & McKee

[57] ABSTRACT

A distillation apparatus includes a distillation unit for distilling feed water. The distillation unit includes an evaporation part, a condensation part and a hydrophobic porous membrane interposed between the evaporation part and the condensation part, which are integrated with one another. A heating unit for heating the feed water and a cooling portion for cooling distillate produced by distillation of the feed water are provided apart from the distillation unit. One or both of the heating unit and the cooling unit are provided with a heat pump. With this construction, an additional heater does not need to be provided, and the distillation unit and both of the heating unit and the cooling unit can be changed in size and performance independently of each other, so that the overall size of the distillation apparatus can be reduced.

40 Claims, 7 Drawing Sheets

DISTILLATION APPARATUS WITH POROUS MEMBRANE AND HEAT PUMP

FIELD OF THE INVENTION AND RELATED ART STATEMENT

This invention relates to a distillation apparatus, and more particularly to a distillation apparatus employing a hydrophobic porous membrane which allows steam to pass therethrough but does not allow water to pass therethrough.

A distillation apparatus of this type is used in a water recycling system in a limited closed space (e.g. a spacecraft, or an airplane).

In a distillation apparatus employing a hydrophobic porous membrane, as disclosed in Japanese Patent Examined Publication No. 49-45461, feed water flows along one side or surface of each of a plurality of layers of hydrophobic porous membranes, and is heated and evaporated by a heat pump. A cooling wall is disposed in opposed relation to the other surface of each hydrophobic porous membrane. The cooling wall is cooled by a heat pump, and steam passed through the hydrophobic porous membrane is cooled by the cooling wall, and is condensed into condensate.

In such a distillation apparatus, the heat pump is of such a design that it is arranged over the entire surface of the hydrophobic porous membrane, and therefore the heat pump and the hydrophobic porous membrane can not be changed in shape and size independently of each other, in accordance with environmental conditions and so on. Further, in addition to the heat pump, a heater must be provided at any one of the hydrophobic porous membranes. Therefore, it has been difficult to reduce the overall size of the apparatus.

In a distillation apparatus described in the Proceedings of 16th International Symposium On Space Technology and Science 1988 (pages 1709 to 1712), a heating unit and a cooling unit are disposed apart from a distillation unit comprising a feed water evaporation part, a steam condensation part and a hydrophobic porous membrane interposed therebetween, which are integrated with one another. Therefore, the distillation unit and both of the heating and the cooling units can be changed in shape, size and performance independently of each other, in accordance with environmental conditions and so on. This makes it easier to reduce the overall size of the apparatus.

In such a distillation apparatus, however, there is not provided any means for reducing the energy consumption at the heating and the cooling units. In other words, there is provided no means for reducing the overall energy consumption in the distillation apparatus.

OBJECT AND SUMMARY OF THE INVENTION

It is therefore an object of this invention to provide a distillation apparatus which is of a smaller size and consumes less energy.

Another object of the invention is to provide a distillation apparatus which achieves a high distillation efficiency.

To this end, according to the present invention, provided is a distillation apparatus comprising:

a feed water flow passage through which feed water to be distilled flows;

a distillate flow passage through which distillate produced by distillation of the feed water flows;

a distillation unit for distilling the feed water, the distillation unit comprising an evaporation part provided in the feed water flow passage, a condensation part provided in the distillate flow passage, and a hydrophobic porous membrane interposed between the evaporating part and the condensation part, and the evaporation part, the condensation part and the hydrophobic porous membrane being integrated with one another;

a heating unit provided apart from the distillation unit and having a heat pump for heating the feed water in the feed water flow passage; and a cooling unit for cooling the distillate in the distillate flow passage, the cooling unit being provided apart from the distillation unit.

In the present invention, the heating unit and/or the cooling unit are provided apart from the distillation unit, and the heating unit and/or the cooling unit have the heat pump. Therefore, in accordance with environmental conditions and so on, the distillation unit and either of the heating unit and the cooling unit can be changed in size and performance independently of each other, so that the overall size of the distillation apparatus can be reduced. Further, because of the use of the heat pump in the heating unit and/or the cooling unit, the distillation apparatus can achieve a better thermal efficiency.

Advantages and features of the present invention will become manifest upon making reference to the following detailed description of the preferred embodiments with reference to the accompanying drawings.

DETAILED DESCRIPTION OF THE PREFERRED EMBODIMENTS

Figure 1:
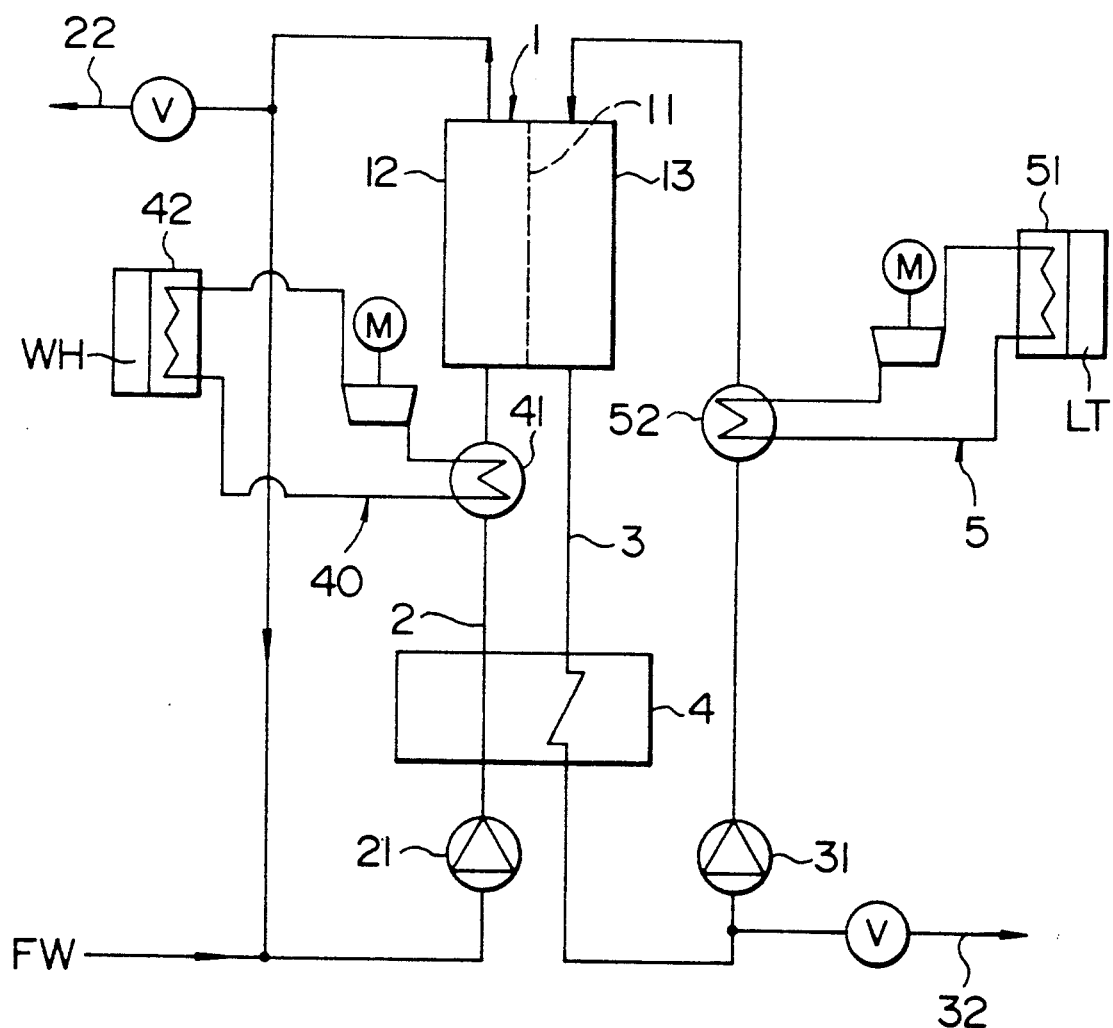
FIG. 1 is a block diagram of a distillation apparatus according to a first embodiment of the invention.

Referring to FIG. 1, a distillation apparatus according to a first embodiment of the invention comprises a distillation unit 1 which includes a hydrophobic porous membrane 11, an evaporation part 12 and a condensation part 13. The hydrophobic porous membrane 11 is interposed between the evaporation part 12 and the condensation part 13, and these are integrated with one another.

A feed water circulating passage 2 and a distillate circulating passage 3 are connected to the distillation unit 1.

Feed water is fed by a feed pump 21 to the feed water circulating passage 2 from a feed water supply portion FW. The pumped feed water passes through a heat exchanger 4 and the evaporation part 12, and is circulated through the feed water circulating passage 2. Part of the concentrated feed water from the evaporation part 12 is discharged to the exterior of the system via a concentrated feed water discharge passage 22.

Distillate is pumped by a feed pump 31 to circulate through the distillate circulating passage 3 via the condensation part 13 and the heat exchanger 4. The circulating distillate effects a heat exchange with the feed water at the heat exchanger 4. Part of the distillate in the distillate circulating passage 3 is extracted via an extraction passage 32.

A radiator portion 41 of a heat pump 40 is provided in the feed water circulating passage 2, apart from the distillation unit 1. A heat absorption portion 42 of the heat pump 40 is connected to a waste heat portion WH of another apparatus (for example, a radiator portion of a computer) or a waste heat portion WH of this distillation apparatus (for example, a motor portion of the feed pump 21).

A heat absorption portion 52 of a heat pump 5 is provided in the distillate circulating passage 3, apart from the distillation unit 1. A radiator portion 51 of the heat pump 5 is connected to a low-temperature portion LT (for example, an atmospheric heat radiating fan) of another apparatus.

The operation of this distillation apparatus will now be described.

The feed water is caused by the feed pump 21 to pass through the feed water circulating passage 2 to enter the heat exchanger 4. At the heat exchanger 4, the feed water effects a heat exchange with the distillate of elevated temperature due to latent heat movement and heat transfer, so that the feed water is preheated. The preheated feed water is heated by the radiator portion 41 of the heat pump 40 up to a required temperature. The thus heated feed water enters the evaporation part 12 of the distillation unit 1. The steam of the feed water passes through the hydrophobic porous membrane 11 into the condensation part 13, and the remainder of the feed water flows into the feed water circulating passage 2. At this time, the feed water in the evaporation part 12 is deprived of the latent heat to be decreased in temperature, and also is concentrated. The concentration of the feed water in the circulating passage is detected by a concentration measurement device such as a conductivity meter, and the feed water of a high concentration is discharged via the concentrated feed water discharge passage 22 when this is required.

On the other hand, the distillate in the distillate circulating passage 3 is cooled by the heat absorption portion 52 of the heat pump 5 down to a required temperature. The thus cooled distillate enters the condensation part 13 of the distillation unit 1, and flows, absorbing the steam of the feed water passed through the hydrophobic porous membrane 11 from the evaporation part 12. As a result, the amount of the distillate in the distillate circulating passage 3 is increased. At this time, the temperature of the distillate rises due to the latent heat produced by the condensation of the steam. The distillate of elevated temperature imparts heat to the feed water at the heat exchanger 4.

The distillate flowing through the distillate circulating passage 3 is taken out to the exterior of the apparatus via the extraction passage 32 when this is required.

In this embodiment, the heat pump 40 serves to heat the feed water. At this time, even when the temperature of the ambient space is lower than the temperature in a feed water heating portion, the feed water can be heated with less electric power than that required by a heater, if the coefficient of performance (hereinafter referred to as "COP") of the heat pump is greater than 1 (i.e., COP>1.0). Therefore, the energy (supply energy) to be supplied to the apparatus so as to evaporate the feed water can be reduced.

A temperature difference between the heat absorption side (the waste heat portion of other apparatus or this distillation apparatus) and the heat radiating side (the feed water heating portion) can be decreased by connecting the heat absorption side of the above heat pump to the waste heat portion of either another apparatus or this distillation apparatus, or to a heat transfer-fluid flow passage passing through the waste heat portion of either the other apparatus or this distillation apparatus, or to a heat transfer member such as a heat pipe. In some cases, the temperature of the heat absorption side can be higher than the temperature of the heat radiating side. In this case, the feed water can be heated with less electric power as compared with the case where the heat from the low-temperature ambient space is utilized. This enables a further reduction of the supply energy.

The heat pump 5 serves to cool the distillate. Even when the temperature of the ambient space is higher than the temperature of a distillate cooling portion, the distillate can be cooled more efficiently compared with a natural cooling, if the COP of the heat pump is greater than 1 (i.e., COP>1.0).

A temperature difference between the heat radiating side (the heat absorption portion of another apparatus or this distillation apparatus) and the heat absorption side (the heat absorption portion for the distillate) can be decreased by connecting the heat radiating side of the above heat pump to the heat absorption portion of either the other apparatus or this distillation apparatus, or to a heat transfer-fluid flow passage passing through the heat absorption portion of either the other apparatus or this distillation apparatus, or to a heat transfer member such as a heat pipe. In some cases, the temperature of the heat radiating side can be lower than the temperature of the heat absorption side. Therefore, the distillate can be cooled with less electric power as compared with the case where the heat is radiated to the low-temperature ambient space. In doing so, the latent heat due to the condensation during the cooling can be removed efficiently.

Either of the heat pumps 40 and 5 can be used alone; however, when the two heat pumps 40 and 5 are used in combination as in this embodiment, the electric power required for the heating and the cooling can be reduced efficiently.

When the heat pumps are a mechanical heat pump of the scroll type, the screw type, the rotary type, the swash plate type, the Stirling type or some other type, the COP can be in the range of about 1.5 to about 3, and therefore the electric power efficiency is improved.

As the heat source for the heat absorption portion 42 of the heat pump 40 connected to the heating portion, in addition to the above-mentioned ones, an electric device (e.g. a pump or a motor provided in another apparatus or this distillation apparatus), electric power generating equipment (which, for example, uses a solar cell, a nuclear power generator, a thermal power generator or a heat power generator) or an electric power transducer device (e.g. an inverter), waste from the electric power generating equipment, or a waste heat portion of a heat pump, can be utilized.

As the heat absorption source for the heat radiating portion 51 of the heat pump 5 connected to the cooling portion, in addition to the above-mentioned ones, a low-temperature portion cooled by a cooling medium such as cooling water supplied to an electric device (e.g. a pump or a motor provided in another apparatus or this distillation apparatus), an electronic device (e.g. a computer), electric power generating equipment (which, for example, uses a solar cell, a nuclear power generator, a thermal power generator or a heat power generator) or an electric power transducer device (e.g. an inverter), a heat absorption portion of a heat pump, or a portion cooled to a low temperature by natural cooling or forced cooling, can be utilized.

Figure 2:
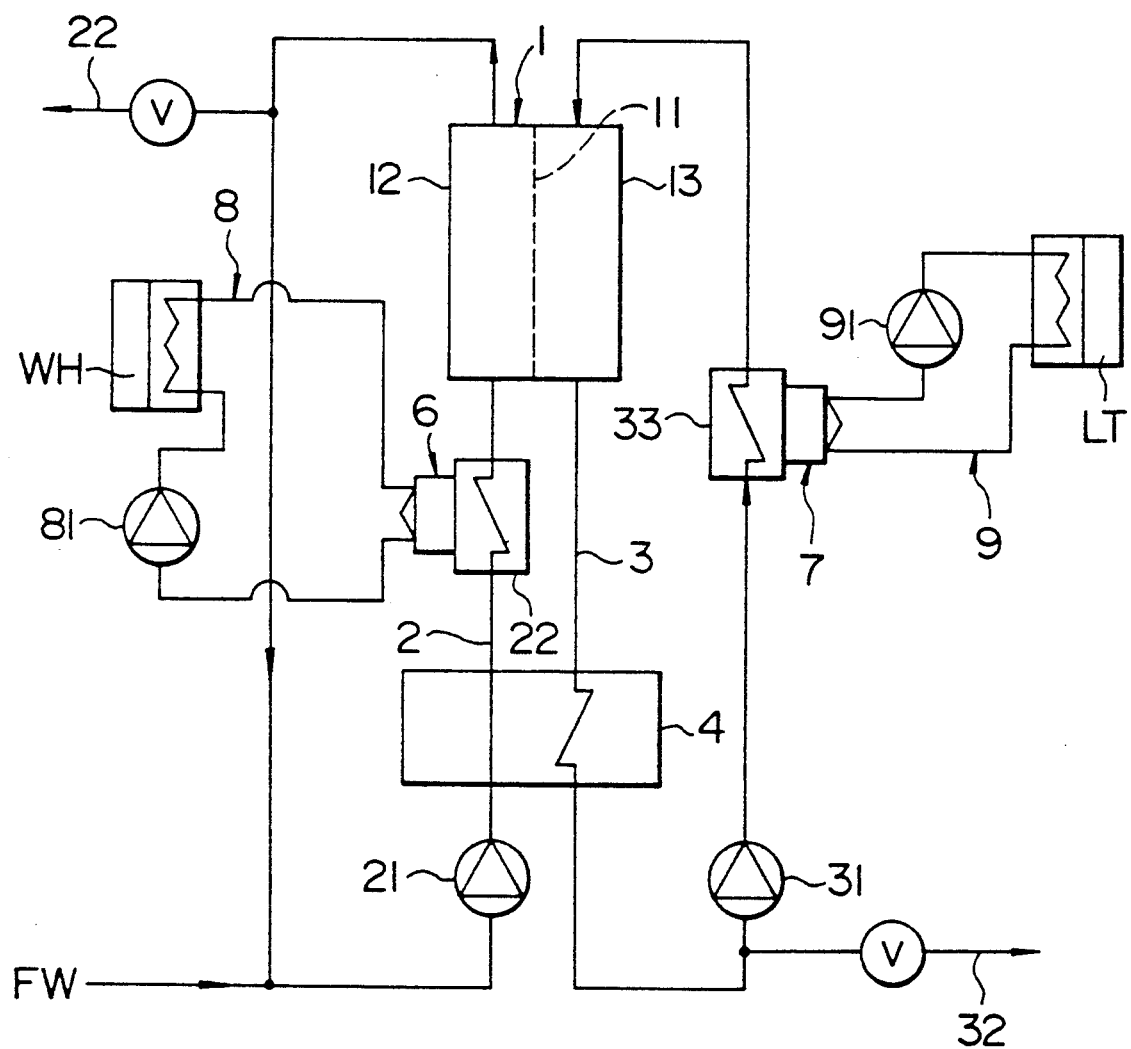
FIGS. 2 to 7 are block diagrams similar to FIG. 1, but showing second to seventh embodiments of the invention, respectively.

Referring to FIG. 2, a second embodiment of the invention differs from the first embodiment in that instead of the mechanical heat pump 40, an electronic heat pump in the form of a thermoelectric cooling element 6 (e.g. Peltier element) is connected at its heat radiating side to a feed water circulating passage 2 via a heat exchanger 22. The heat absorption side of the thermoelectric cooling element 6 is connected to a heat transfer-fluid circulating passage 8 passing through a waste heat portion WH. A pump 81 is provided in the heat transfer-fluid circulating passage 8.

Another thermoelectric cooling element 7 is connected at its heat absorption side to a distillate circulating passage 3 via a heat exchanger 33. The heat radiating side of the thermoelectric cooling element 7 is connected to a heat transfer-fluid circulating passage 9 passing through a low-temperature portion LT. A pump 91 is provided in the heat transfer-fluid circulating passage 9.

In this second embodiment, the heat transfer-fluid circulating passages 8 and 9 are arranged at arbitrary positions within the apparatus, and the length of each of the circulating passages 8 and 9 can be increased to a certain degree without affecting the thermal insulating effect. Therefore, the usable heat discharge portion or the usable low-temperature portion can be increased to a greater extent. The space heretofore not effectively used can be used effectively, which contributes to the small-size overall construction of the apparatus.

The constructions, operations and effects of other parts than the thermoelectric cooling elements and their associated parts in the second embodiment are similar to those in the first embodiment.

Figure 3:
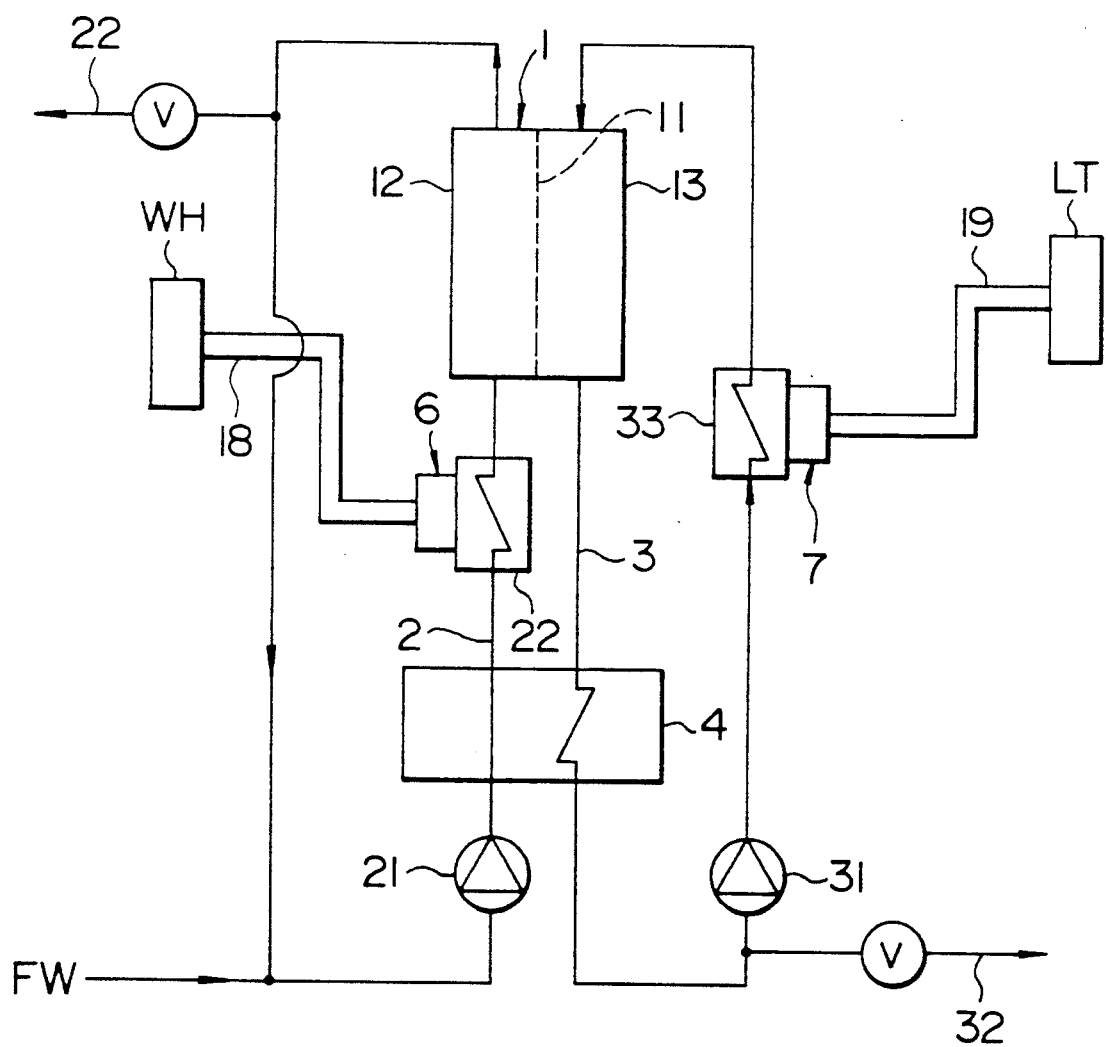

Referring to FIG. 3, a third embodiment of the invention differs from the second embodiment in that a heat pipe 18 is used instead of the heat transfer-fluid circulating passage 8 and that a heat pipe 19 is used instead of the heat transfer-fluid circulating passage 9.

In the third embodiment, since the opposite ends of the heat pipe 18 have the same temperature, heat loss is reduced, thereby improving the efficiency of the whole of the apparatus.

The constructions, operations and effects of other parts than the thermoelectric cooling elements and their associated parts in the third embodiment are similar to those in the first and second embodiments.

In the third embodiment, the thermoelectric cooling elements (electronic heat pumps) 6 and 7 can be replaced by the mechanical heat pumps 40 and 5 of the first embodiment, respectively.

Figure 4:
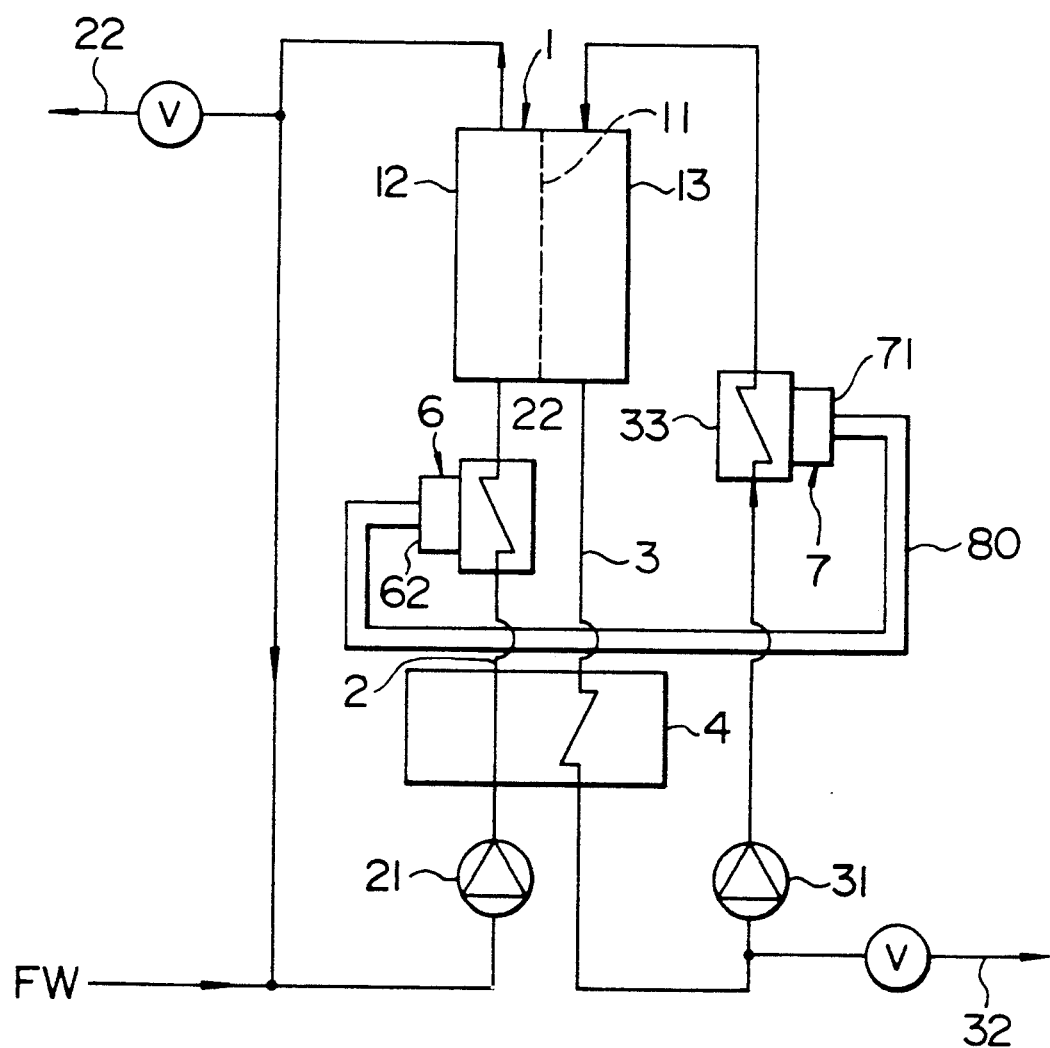

In a fourth embodiment of the invention shown in FIG. 4, a heat radiating portion 71 of a heat pump (thermoelectric cooling element) 7 is connected, as a heat source, to a heat absorption portion 62 of a heat pump (thermoelectric cooling element) 6 via a heat pipe 80. In other words, the heat absorption portion 62 of the heat pump 6 is connected, as a low-temperature heat source, to the heat radiating portion 71 of the heat pump 7 via the heat pipe 80.

A heat radiating portion of another heat pump other than the heat pump 7 can be used as the heat source, and a heat absorption portion of another heat pump other than the heat pump 6 can be used as the low-temperature heat source.

If the sum of the power consumptions of the thermoelectric cooling elements 6 and 7 is about equal to or greater than the quantity of the heat removed from the cooling portion, a heat budget (balance) between a feed water circulating passage 2 and a distillate circulating passage 3 is unbalanced. Therefore, in such a case, it is necessary to provide a low-temperature portion LT at the cooling unit, as in the first to third embodiments of FIGS. 1 to 3.

In the fourth embodiment, the waste heat from the heat pump provided at the cooling portion can be used for heating the feed water at the heating portion, and therefore the energy efficiency is improved.

The electronic heat pumps (thermoelectric cooling elements) 6 and 7 can be replaced respectively by mechanical heat pumps such as the mechanical heat pumps 40 and 5 shown in FIG. 1.

Figure 5:
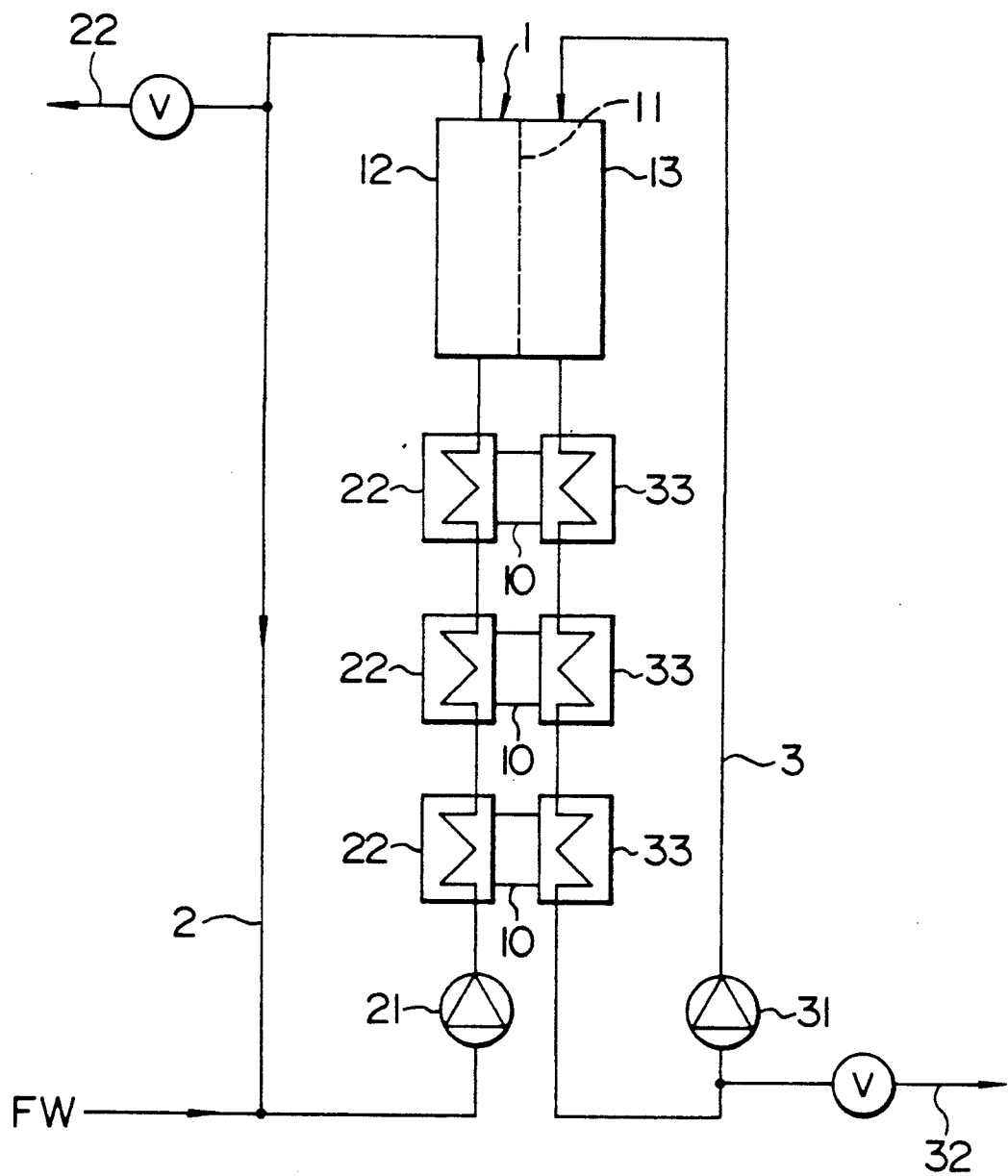

In a fifth embodiment of the invention shown in FIG. 5, latent heat absorbed by the distillate is directly used for heating feed water. The fifth embodiment differs from the fourth embodiment in that the heat exchanger 4 for preheating and the heat pipe 8 are omitted.

Heat radiating sides of thermoelectric cooling elements (electronic heat pumps) 10 are disposed in a feed water circulating passage 2 via heat exchangers 22, and heat absorbing sides thereof are disposed in a distillate circulating passage 3 via heat exchangers 33.

Heat pump units each incorporating the heat exchangers 22 and 33 and the thermoelectric cooling element 10 are arranged in a multi-stage fashion in such a manner that the heat exchangers 22 and 33 of each heat pump unit are spaced equidistantly from a distillation unit 1. With this arrangement, the average temperature difference between the heating unit and the cooling unit in each stage is made small.

Therefore, in the fifth embodiment, there is no need to provide a heat exchanger, and advantageously the apparatus can be of a small size.

Further, since the heating portion and the cooling portion are interconnected directly by the heat pump, the heat efficiency is further improved.

In the fifth embodiment, the thermoelectric cooling element 10 may be replaced by the mechanical heat pump shown in FIG. 1.

The constructions, operations and effects of other parts than the thermoelectric cooling elements 10 and their associated parts in the fifth embodiment are similar to those in the first to fourth embodiments.

Figure 6:
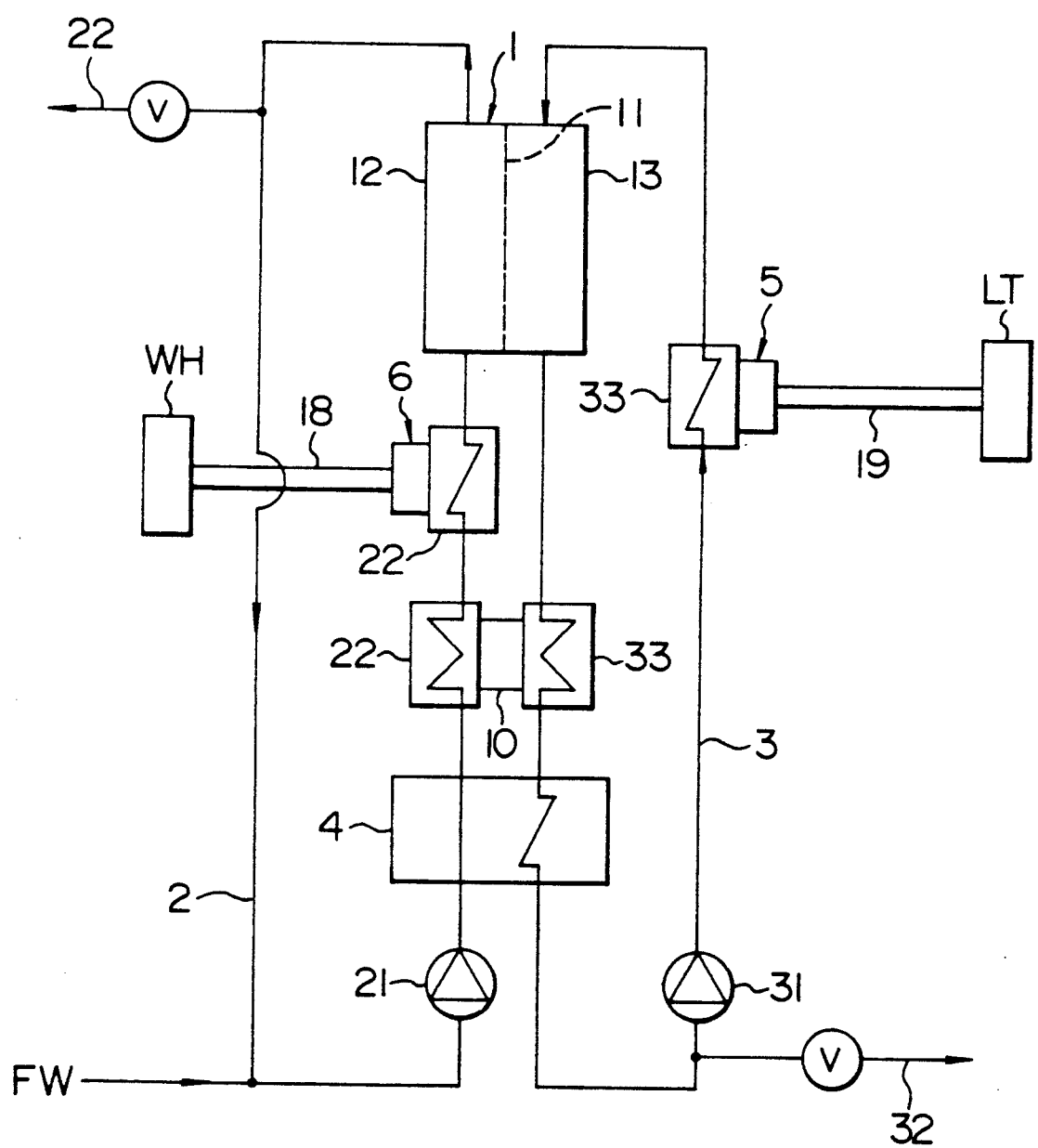

A sixth embodiment shown in FIG. 6 is a combination of the third and fifth embodiments.

Figure 7:
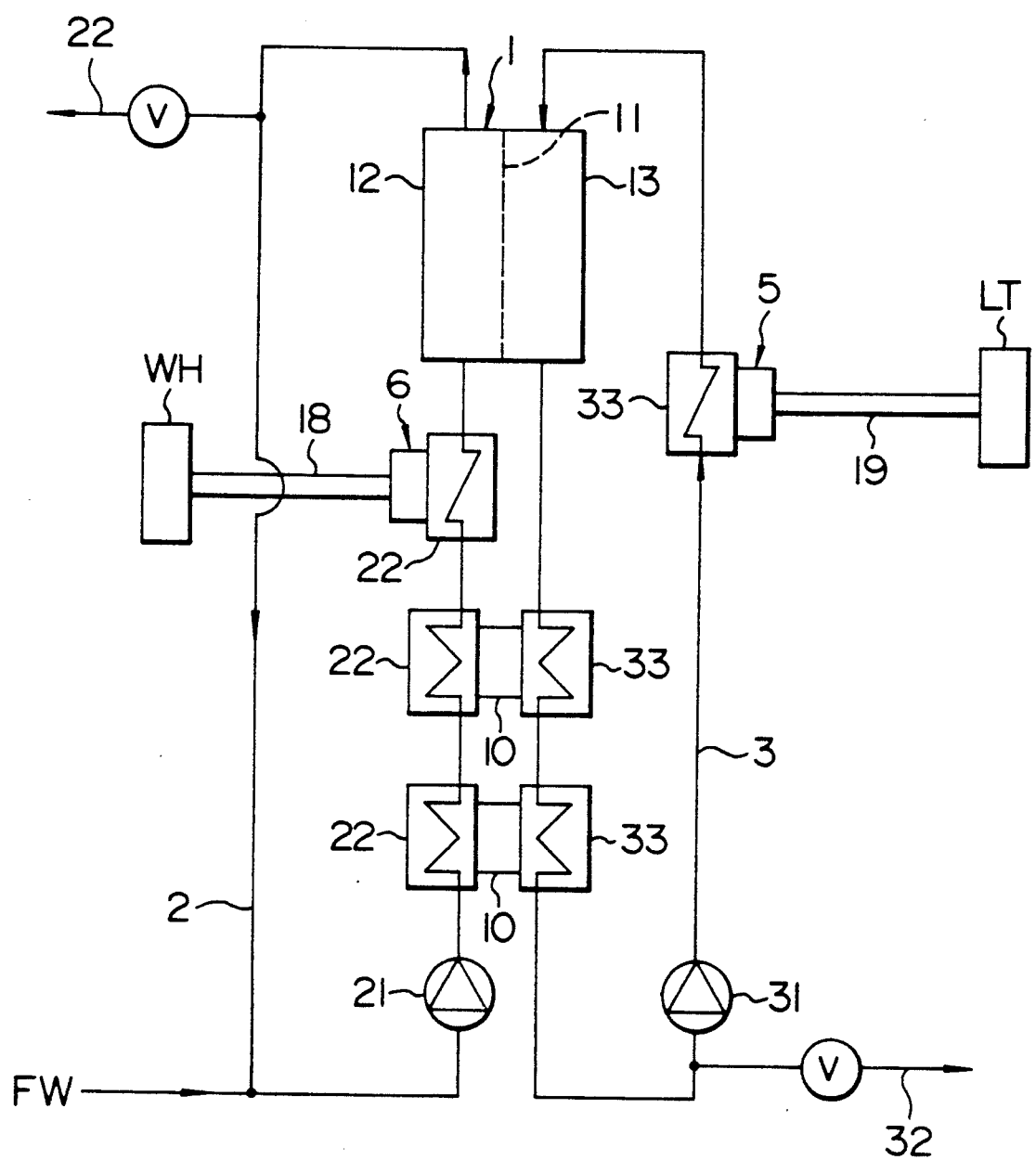

A seventh embodiment shown in FIG. 7 is a combination of the third and fifth embodiments, with the heat exchangers omitted.

In the sixth and seventh embodiments, the heat budget of the feed water and the heat budget of the distillate can be adjusted by a plurality of heat pumps, and therefore the heat balance can be optimized.

The constructions, operations and effects of the sixth and seventh embodiments are similar to those in the first to fifth embodiments.

What is claimed is:

1. A distillation apparatus comprising:
   a feed water flow passage through which feed water to be distilled flows;
   a distillate flow passage through which distillate produced by distillation of said feed water flows;
   a distillation unit for distilling said feed water, said distillation unit comprising an evaporation part provided in said feed water flow passage, a condensation part provided in said distillate flow passage, and a hydrophobic porous membrane interposed between said evaporation part and said condensation part, said distillate flow passage introducing at least a portion of the distillate into contact with steam that passes through said hydrophobic porous membrane from said evaporation part, wherein said evaporation part, said condensation part and said hydrophobic porous membrane are integrated with one another;

a heating unit provided apart from said distillation unit and having a heat pump for heating said feed water in said feed water flow passage; and a cooling unit for cooling said distillate in said distillate flow passage, said cooling unit being provided apart from said distillation unit;

wherein a heat radiating side of said heat pump of said heating unit is disposed in said feed water flow passage whereas a heat absorption side of said heat pump is connected to a waste heat source.

2. A distillation apparatus comprising:

a feed water flow passage through which feed water to be distilled flows;

a distillate flow passage through which distillate produced by distillation of said feed water flows;

a distillation unit for distilling said feed water, said distillation unit comprising an evaporation part provided in said feed water flow passage, a condensation part provided in said distillate flow passage, and a hydrophobic porous membrane interposed between said evaporation part and said condensation part, said distillate flow passage introducing at least a portion of the distillate into contact with steam that passes through said hydrophobic porous membrane from said evaporation part, wherein said evaporation part, said condensation part and said hydrophobic porous membrane are integrated with one another;

a heating unit for heating said feed water in said feed water flow passage, said heating unit being provided apart from said distillation unit; and a cooling unit provided apart from said distillation unit and having a heat pump for cooling said distillate in said distillate flow passage;

wherein a heat absorption side of said heat pump of said cooling unit is disposed in said distillate flow passage whereas a heat radiating side of said heat pump is connected to an absorption heat source.

3. A distillation apparatus according to claim 2, wherein said heating unit has a heat pump.

4. A distillation apparatus according to claim 1, wherein said heat pump is of the mechanical type.

5. A distillation apparatus according to claim 1, wherein said heat pump is an electronic element.

6. A distillation apparatus according to claim 3, wherein said heat pump of said heating unit is an electronic element, and wherein a heat radiating side of said electronic element is diposed in said feed water flow passage whereas a heat absorption side of said electronic element is disposed in said distillate flow passage.

7. A distillation apparatus comprising:

a distillation unit for distilling feed water, said distillation unit comprising an evaporation part, a condensation part, and a hydrophobic porous membrane interposed between said evaporation part and said condensation part, and said evaporation part, said condensation part and said hydrophobic porous membrane being integrated with one another;

means for supplying said feed water to said evaporation part;

a heating unit provided apart from said distillation unit so as to heat said feed water, said heating unit having a heat pump;

means for circulating distillate from said distillation unit through said condensation part to contact steam that passes through said hydrophobic porous membrane; and a cooling unit provided apart from said distillation unit so as to cool said distillate;

wherein a heat radiating side of said heat pump of said heating unit is disposed in said feed water supply means whereas a heat absorption side of said heat pump is connected to a waste heat source.

8. A distillation apparatus comprising:

a distillation unit for distilling feed water, said distillation unit comprising an evaporation part, a condensation part, and a hydrophobic porous membrane interposed between said evaporation part and said condensation part, wherein said evaporation part, said condensation part and said hydrophobic porous membrane are integrated with one another;

means for supplying said feed water to said evaporation part;

a heating unit provided apart from said distillation unit so as to heat said feed water;

means for circulating distillate from said distillation unit through said condensation part to contact steam that passes through said hydrophobic porous membrane; and a cooling unit provided apart from said distillation unit so as to cool said distillate, said cooling unit having a heat pump;

wherein a heat absorption side of said heat pump of said cooling unit is disposed in said distillate circulating means whereas a heat radiating side of said heat pump is connected to a heat absorption source.

9. A distillation apparatus according to claim 8, wherein said heating unit has a heat pump.

10. A distillation apparatus according to claim 7, wherein said heat pump is of the mechanical type.

11. A distillation apparatus according to claim 7, wherein said heat pump is an electronic element.

12. A distillation apparatus according to claim 9, wherein said heat pump of said heating unit is an electronic element, and wherein a heat radiating side of said electronic element is disposed in said feed water supply means whereas a heat absorption side of said electronic element is disposed in said distillate circulating means.

13. A distillation apparatus according to claim 2, wherein said heat pump is of the mechanical type.

14. A distillation apparatus according to claim 3, wherein at least one of said heat pumps is of the mechanical type.

15. A distillation apparatus according to claim 2, wherein said heat pump is an electronic element.

16. A distillation apparatus according to claim 3, wherein at least one of said heat pumps is an electronic element.

17. A distillation apparatus according to claim 3, wherein at least one of a heat radiating side of said heat pump of said heating unit is disposed in said feed water flow passage whereas a heat absorption side of said heat pump of said heating unit is connected to a waste heat source.

18. A distillation apparatus according to claim 8, wherein said heat pump is of the mechanical type.

19. A distillation apparatus according to claim 9, wherein at least one of said heat pumps is of the mechanical type.

20. A distillation apparatus according to claim 8, wherein said heat pump is an electronic element.

21. A distillation apparatus according to claim 9, wherein at least one of said heat pumps is an electronic element.

22. A distillation apparatus according to claim 9, wherein a heat radiating side of said heat pump of said heating unit is disposed in said feed water supply means whereas a heat absorption side of said heat pump of said heating unit is connected to a waste heat source.

23. A distillation apparatus as claimed in claim 1, further comprising a heat exchanger, through which both said feed water flow passage and said distillate flow passage pass, for exchanging heat between the distillate flowing through the distillate flow passage and the feed water passing through the feed water passage.

24. A distillation apparatus as claimed in claim 23, wherein said heat exchanger is located upstream of the heating unit with respect to the feed water flow passage.

25. A distillation apparatus as claimed in claim 23, wherein said cooling unit includes a heat pump, and wherein said heat exchanger is located upstream of the cooling unit with respect to the distillate flow passage.

26. A distillation apparatus as claimed in claim 2, further comprising a heat exchanger, through which both said feed water flow passage and said distillate flow passage pass, for exchanging heat between the distillate flowing through the distillate flow passage and the feed water passing through the feed water passage.

27. A distillation apparatus as claimed in claim 26, wherein said heat exchanger is located upstream of the cooling unit with respect to the distillate flow passage.

28. A distillation apparatus according to claim 26, wherein said heating unit includes a heat pump, and wherein said heat exchanger is located upstream of the heating unit with respect to the feed water flow passage.

29. A distillation apparatus as claimed in claim 7, further comprising a heat exchanger for exchanging heat between the distillate and the feed water.

30. A distillation apparatus as claimed in claim 29, wherein said heat exchanger is located upstream of the heating unit with respect to flow of the feed water.

31. A distillation apparatus as claimed in claim 29, wherein said cooling unit includes a heat pump, and wherein said heat exchanger is located upstream of the cooling unit with respect to the distillate flow passage.

32. A distillation apparatus as claimed in claim 8, further comprising a heat exchanger for exchanging heat between the distillate and the feed water.

33. A distillation apparatus as claimed in claim 32, wherein said heating unit includes a heat pump, and wherein said heat exchanger is located upstream of the heating unit with respect to flow of the feed water.

34. A distillation apparatus as claimed in claim 32, wherein said heat exchanger is located upstream of the cooling unit with respect to the distillate flow passage.

35. A distillation apparatus as claimed in claim 1, wherein said heat pump of said heating unit has a coefficient of performance greater than 1.0.

36. A distillation apparatus as claimed in claim 2, wherein said heat pump of said cooling unit has a coefficient of performance greater than 1.0.

37. A distillation apparatus as claimed in claim 3, wherein said heat pump of said heating unit has a coefficient of performance greater than 1.0.

38. A distillation apparatus as claimed in claim 7, wherein said heat pump of said heating unit has a coefficient of performance greater than 1.0.

39. A distillation apparatus as claimed in claim 8, wherein said heat pump of said cooling unit has a coefficient of performance greater than 1.0.

40. A distillation apparatus as claimed in claim 9, wherein said heat pump of said heating unit has a coefficient of performance greater than 1.0.

* * * * *